United States Patent Office 2,894,810
Patented July 14, 1959

2,894,810

COLUMBIC OXIDE ADSORPTION PROCESS FOR SEPARATING URANIUM AND PLUTONIUM IONS

Roy H. Beaton, Oak Ridge, Tenn., assignor to the United States of America as represented by the United States Atomic Energy Commission No Drawing. Application August 29, 1944
Serial No. 551,771

11 Claims. (Cl. 23—14.5)

The invention relates to an adsorption process for separating substances from each other, and more particularly to an adsorption process in which columbic oxide is used as an adsorbent for separating substances of the type present in neutron-irradiated uranium.

An object of the invention is the provision of a separation process in which certain substances such as plutonium (element 94) may be selectively or preferentially adsorbed by means of columbic oxide.

A more specific object of the invention is to provide an adsorption process in which a dispersion or solution of the substances to be adsorbed is passed through a bed or layer of an adsorbent.

A further object of the invention is the provision of a separation process utilizing columbic oxide as an adsorbent in which a selective adsorption process is effected and the tendency of one or more of the substances to be adsorbed when brought in contact with the adsorbent is modified by changing the oxidation state of the substances.

A further object of the invention is to provide an adsorbent in a form that will facilitate selective or preferential adsorption of substances of the type present in neutron-irradiated uranium.

Further objects and advantages will appear from the following description.

In the following description, the isotope of element 93 having a mass of 239 is referred to as $93^{239}$ and the isotope of element 94 having a mass of 239 is referred to as $94^{239}$. Element 94 may also be designated as plutonium, symbol Pu. Reference herein to any of the elements is to be understood as denoting the element generically, whether in its free state or in the form of a compound, unless indicated otherwise by the context.

Neutron-irradiated uranium may be prepared by reacting uranium in metallic state or as a uranium compound with neutrons from any suitable neutron source, such as for exomple, neutrons generated by use of the cyclotron.

Naturally occurring uranium contains a major portion of $_{92}U^{238}$, a minor portion of $_{92}U^{235}$ and small amounts of other substances such as $UX_1$ and $UX_2$. When a mass of such uranium is subjected to neutron irradiation, particularly with neutrons of resonance or thermal energies, $_{92}U^{238}$ by capture of a neutron becomes $_{92}U^{239}$ which has a half life of about 23 minutes and by beta decay becomes $93^{239}$. The $93^{239}$ has a half life of about 2.3 days and by beta decay becomes $94^{239}$. Thus, neutron-irradiated uranium contains both $93^{239}$ and $94^{239}$, but by allowing such irradiated uranium to stand for a suitable period of time, the $93^{239}$ is converted almost entirely to $94^{239}$.

In addition to the above-mentioned reaction, the reaction of neutrons with fissionable nuclei such as the nucleus of $_{92}U^{235}$ results in the production of a large number of radioactive fission products. As it is undesirable to produce a large concentration of these fission products which must, in view of their high radioactivity, be separated from the $94^{239}$ and further since it is desirable to avoid substantial fission of $94^{239}$, it is preferable to discontinue the irradiation of the uranium by neutrons while the combined amount of $93^{239}$ and $94^{239}$ is small. Usually the process is discontinued before the combined amount of $93^{239}$ and $94^{239}$ exceeds 0.1 percent of the uranium mass and mostly while this amount is equal to approximately 0.02 percent by weight of the uranium mass. At this concentration of these substances, the concentration of fission elements, which must be removed, is approximately the same percentage.

The fission products comprise a large number of elements which may be classified into two groups: a light group with atomic numbers from 35 to 45 and a heavy group with atomic numbers from 51 to 60. The fission products which are particularly objectionable are those having a radioactive half-life of more than three days, since many of these products retain their radioactivity for periods of one month or longer after reaction. The products are chiefly radioactive isotopes of Sr, Y, Zr, Cb, and Ru of the group of atomic numbers from 35 to 45; and Te, I, Xe, Cs, Ba, La, and Ce from the group of atomic numbers from 51 to 60, inclusive.

In order to effect a separation of the plutonium from the irradiated uranium and fission products, an aqueous solution of the neutron-irradiated uranium is secured. This solution which contains plutonium in very small concentrations only must then be treated to remove the plutonium.

In accordance with the present invention it has been found that plutonium and/or fission products and uranium may be adsorbed from an aqueous solution, containing one or more of these substances, by columbic oxide. Furthermore, it has been found that plutonium and fission products, even though present in small concentration, may be largely adsorbed from aqueous solutions, including aqueous solutions containing substantial quantities of uranium or neutron-irradiated uranium. The columbic oxide containing the plutonium and/or fission products may be treated to remove the adsorbed products, or it may be used as such as a source of radioactivity or as a means for storing or shipping plutonium under conditions such that little fission of the plutonium occurs.

Anhydrous or hydrated columbic oxide may be used for such purpose. However if hydrated columbic oxide for use in accordance with the present invention is prepared by precipitation from an aqueous solution it should be dried until it contains no substantial quantity of uncombined water in liquid state.

The removal of plutonium is particularly effective when the dissolved or dispersed plutonium is in a lower valence state, such as the tri- or tetravalent state. While hexavalent plutonium may be removed, columbic oxide is somewhat less effective in such a case and it is possible to adsorb fission products together with some hexavalent plutonium from a solution containing these materials leaving a solution containing hexavalent plutonium somewhat more free from fission products. The process is particularly effective for treatment of nitrate solutions containing more or less free acid. However other solutions, such as sulphate, phosphate containing uranium, plutonium and/or fission products may be treated as herein described.

This adsorption may be accomplished by various means such as by passing a solution containing the plutonium to be separated through a porous bed or column containing suitably prepared columbic oxide. It has also been found that the efficiency of the columbic oxide as an adsorbent is enhanced when the material is in the form of granules of hydrated oxide, particularly where the separation process involves column adsorption. Thus, the separation process using columbic oxide as an adsorbent may be carried out by passing a liquid containing the substances to be adsorbed through a bed or layer of the columbic oxide placed in a container designed to hold a suitable quantity of the adsorbent. The container may be in the form of an elongated, vertical tube or cylinder, and the liquid may be passed either upwardly, downwardly or laterally through the columbic oxide in said container. This container may be of any suitable material, such as glass, stainless steel, glass-lined metal or the like, that will not be corroded by the liquid containing the substances to be adsorbed. Means such as a porous plate or screen may be provided at the top and bottom of the container to retain the columbic oxide in the column while permitting the passage of liquid therethrough.

The invention is particularly adapted to treatment of neutron-irradiated uranium dissolved in nitric acid such as a 10 percent solution of uranyl nitrate hexahydrate, $UO_2(NO_3)_2 \cdot 6H_2O$, the solution having a pH of approximately 2.4. The solution is then flowed through a porous bed containing a suitable amount of the columbic oxide adsorbent and of sufficient depth to adsorb a major portion or substantially all of the plutonium and fission products during the passage of the solution through the column. Usually such a bed should have a depth of at least 12 to 24 inches, and beds of substantially greater depth may be used where rapid flow of liquid is desired. Although it is desirable to prevent adsorption of the uranium, there is a tendency for a portion of the uranium to be adsorbed in the column. The unadsorbed uranium passes out of the column as dissolved uranyl nitrate solution and is collected as a separate fraction.

If desired the adsorbed uranium or a substantial portion thereof may be removed prior to recovery of the adsorbed plutonium. For example a desorbing solution may be flowed through the column to remove the adsorbed uranium. Such desorbing solution preferably comprises a dilute acid solution such as a solution of sulphuric acid in a concentration of up to about 0.5 mole per liter of solution. A solution of 0.25 M $H_2SO_4$ is particularly effective for this purpose. This desorbing agent removes substantially all the adsorbed uranium without removing the adsorbed plutonium and fission products. The desorbing solution containing the eluted uranium may be combined with the first fraction to constitute the uranium fraction. Adsorbed plutonium and fission products may be removed from the adsorbent by means of a moderately concentrated acid solution such as, for example, a 3 N solution of nitric acid; the concentration of the nitric acid, however, should be at least 1 N. This solution desorbes substantially all of the adsorbed plutonium and major amounts of the adsorbed fission products. Other acid solutions including sulphuric acid solutions of suitable concentration have been found to be satisfactory in removing the adsorbed plutonium, such as a dilute solution comprising sulphuric acid and sodium sulphate, for example, a solution which contains 0.5 mole or more of $H_2SO_4$ and 1 mole of $Na_2SO_4$ per liter of solution.

In carrying out column adsorption, the flow of liquids through the column is preferably downwardly, thereby utilizing the advantage of gravity flow. The rate of flow or percolation of the solution through the column may be increased by applying pressure to the solution entering the column or by applying suction to the solution leaving the column. The degree of pressure or suction to be applied is dependent upon the resistance in the column to the flow of the solution, this in turn being largely dependent upon such factors as the physical characteristics of the columbic oxide used in the column, the cross-sectional area of the adsorbent bed, and the rate of flow of the solution that is desired. Where the original solution has been passed downwardly through the column and the adsorbates are concentrated in the upper portion of the adsorbent, it may be desirable to remove the adsorbates by passing the desorbing solution upwardly through the column, thereby using a smaller volume of desorbing solution than would otherwise be required. Conversely, the original solution may be passed upwardly through the column and the desorbing solutions passed downwardly through the column.

Columbic oxide prepared and used as herein described has the formula $Cb_2O_5$ in its anhydrous form and $$Cb_2O_5 \cdot x(H_2O)$$

wherein $x$ represents a small whole number, in the hydrated state. Water contained in the hydrate is generally present in combined form as distinguished from uncombined water in liquid state such as is present when the oxide is initially precipitated in the aqueous medium. Prior to use it is frequently desirable to wet the columbic oxide with water in order to improve its contact with the irradiated solution to be treated and thereby to decrease the required period of contact.

Commercial columbic oxide is generally in the form of a fine powder which is an effective adsorbent. However the fine powder has a higher resistance to the flow of solutions. It has been found that by use of columbic oxide in the form of granules less resistance is encountered.

One method of preparing the columbic oxide granules comprises sintering powdered columbic oxide. In this method, the powdered columbic oxide is placed in a suitable refractory container and gradually heated by suitable heating means to a temperature of between 1100 degrees C. and 1300 degrees C. and maintained at this temperature until sintering of the powdered columbic oxide occurs. The resulting columbic oxide mass is then ground to the desired particle size. This manner of preparing the columbic oxide granules, however, tends to decrease the adsorption properties of the columbic oxide for uranium, plutonium, and fission products.

A second manner of preparing the columbic oxide granules is the oxidation of columbian metal having a particle size of from 60 to 100 mesh. The finely divided columbian metal is placed in a quartz tube supported vertically in a split-ring furnace. Air is passed through the metal as the temperature is being raised to approximately 875 degrees C. After treating for from one to three hours, oxidation is complete and the product is in the form of the desired columbic oxide granules. This manner of preparing the granular columbic oxide, however, also tends to decrease the adsorption properties of the columbic oxide for uranium, plutonium, and fission products.

In accordance with a preferred manner of preparing the columbic oxide granules for plutonium and/or fission product adsorption a columbic oxide may be precipitated from an aqueous medium and dried at a temperature of about 100 degrees C. until a solid mass which may be crushed to size is secured. For example columbium metal may be dissolved in a mixture of hydrofluoric acid and nitric acid, and a precipitate of hydrated columbic oxide may then be obtained by the addition of ammonium hydroxide. The columbic oxide precipitate is removed from the solution by filtration or centrifugation and is dried at a temperature of approximately 100 degrees C. The resulting columbic oxide mass is then ground, crushed or crumbled to the desired particle size. Granular columbic oxides so prepared is especially effective in the adsorption of uranium, plutonium, and fission products.

The particle size of the granular columbic oxide should be large enough to offer little resistance to the flow of liquids through the adsorbent bed, while being small enough to cause the adsorbent to have a sufficiently large surface area to provide rapid and substantially complete adsorption of the substances contained in the solution. A particle size which has been found to be particularly suitable from the aspect both of low resistance to the flow of the solution and of satisfactory adsorption of uranium, plutonium, and fission products is a particle size between about 60 and 100 mesh.

While the invention is particularly advantageous when applied to a more or less continuous process of adsorption involving passage of the liquid through a porous bed of the adsorbent, other methods of effecting the adsorption may be resorted to. For example the columbic oxide may be dispersed in the liquid to be treated and subsequently removed by settling and/or filtration. During adsorption the liquid may be agitated to provide more intimate contact of the adsorbent and the substances to be adsorbed. The liquid and suspended granular $Cb_2O_5$ may be agitated in any conventional manner, for example, by means of a rotating stirrer or beater extending into the solution. The substances adsorbed in the batch process, such as uranium, plutonium, or fission products, may be eluted or desorbed from the columbic oxide by acid solutions as previously described.

While the columbic oxide adsorption process is particularly suitable for the separation of uranium from plutonium and fission products, such process may also be used to separate the plutonium from the fission products. The plutonium and fission products are first obtained as a separate fraction by the removal of the uranium as, for example, in a preliminary columbic oxide adsorption cycle. An oxidizing agent is then added to the solution containing the plutonium and fission products, and the plutonium is oxidized to a higher oxidation state. Plutonium obtained by adsorption from a solution of neutron-irradiated uranium generally is found to be in a lower or reduced state of oxidation (tetravalent or trivalent) in which it is water-insoluble as a fluoride and as a phosphate. After being oxidized by suitable oxidizing agents, the plutonium is converted to a higher oxidation state, which may be the hexavalent state, in which state it is water-soluble as a fluoride and as a phosphate. Suitable oxidizing agents for converting the plutonium from its reduced state to its higher oxidation state are potassium dichromate, sodium dichromate, sodium bismuthate and the like, preferably in an aqueous acid solution.

After the plutonium has been converted to its higher oxidation state, the solution containing the oxidized plutonium and the fission products is brought into contact with columbic oxide in either a column or a batch adsorption process. It has been found that a major portion of the fission products are adsorbed, but that the oxidized plutonium is adsorbed less strongly than the reduced plutonium. Consequently the solution containing the unadsorbed plutonium is collected as a separate fraction after removal from the columbic oxide. In one example of the separation of plutonium from fission products, a uranium-free solution containing sulphuric acid, sodium sulphate, some uranium and fission products, and 0.000005 gram of oxidized plutonium per 100 grams of solution, and having a pH value of approximately 3.6, was shaken with one gram of columbic oxide per 10 cc. of solution for ten minutes. It was found that only approximately 57 percent of the oxidized plutonium was adsorbed, the remaining 43 percent being collected as a separate plutonium fraction containing negligible amounts of fission products after being drained from the adsorbent.

The dissolved or dispersed plutonium remaining in the solution in its oxidized state may be reduced to its normal or reduced state by suitable reducing agents, for example, hydrogen peroxide, sulphur dioxide and the like, and may then be recovered by adsorption with columbic oxide or other adsorbents. The adsorbed fission products may be left on the columbic oxide or may be removed from the adsorbent by washing the columbic oxide with an eluting agent, for example, dilute nitric acid or a dilute solution of sulphuric acid and sodium bisulphate. The separation of the fission products and the oxidized plutonium may be carried out with either powdered columbic oxide or granular columbic oxite.

Batch adsorption tests on the columbic oxide adsorption process were performed, and the results are given in the following tables. Certain of the solotions used contained only plutonium and fission products. These solutions were obtained by passing a nitric acid solution of neutron-irradiated uranium also containing plutonium and fission products through an adsorption column containing a cation exchange adsorbent such as, for example, a phenolic condensation product comprising numerous sulphonic acid groups. The solutions treated contained approximately 0.000005 gram of plutonium per 100 grams of solution and a small quantity of fission products. Both fission products and plutonium were present as nitrates and the plutonium was in the tri and/or tetravalent state.

In Table I are given the results of standard batch adsorption tests in which one gram of columbic oxide previously soaked with water was agitated with 10 cc. of the test solution indicated in the table and the columbic oxide was then separated from the solution. The percentage of fission products adsorbed is given in terms of beta and gamma ray activity.

*Table I*

| Sample No. | Adsorbent | Solution | Time of Agitation in Minutes | Percent Adsorption | | |
|---|---|---|---|---|---|---|
| | | | | Pu | Beta | Gamma |
| 1 | Powdered $Cb_2O_5 \cdot xH_2O$ | Uranium-free solution containing plutonium and fission products and having a pH value of ~3.6. | 10 | 99.3 | 44 | 64 |
| 2 | Powdered $Cb_2O_5 \cdot xH_2O$ | ----do---- | 60 | 100 | 41 | 74 |
| 3 | Powdered $Cb_2O_5 \cdot xH_2O$ | 10% neutron-irradiated uranyl nitrate hexahydrate containing 0.00000005 percent Plutonium. | 15 | 78 | 29 | 71 |
| 4 | Powdered $Cb_2O_5 \cdot xH_2O$ | Uranium-free solution containing plutonium and fission products and having a pH value of ~0.4. | 10 | 64 | 18 | 37 |
| 5 | Powdered $Cb_2O_5 \cdot xH_2O$ | ----do---- | 60 | 79 | 13 | 51 |
| 6 | Granular $Cb_2O_5 \cdot xH_2O$ (fused at 1,200° C. and ground to 60-100 mesh). | Uranium-free solution containing plutonium and fission products and having a pH value of ~3.6. | 5 | 60 | 36 | 50 |
| 7 | Granular $Cb_2O_5 \cdot xH_2O$ (fused at 1,200° C. and ground to 60-100 mesh). | 10% neutron-irradiated uranyl nitrate hexahydrate containing 0.00000005 percent plutonium. | 5 | 22 | 12 | 25 |
| 8 | Granular $Cb_2O_5 \cdot xH_2O$ (fused at 1,200° C. and ground to 60-100 mesh). | ----do---- | 60 | 32 | 1 | 37 |
| 9 | Granular $Cb_2O_5 \cdot xH_2O$ (from oxidation of columbium metal of 60-100 mesh). | Uranium-free solution containing plutonium and fission products and having a pH value of ~3.6. | 10 | 59 | 31 | 25 |
| 10 | Granular $Cb_2O_5 \cdot xH_2O$ (from precipitated $Cb_2O_5$ dried at 100° C. and ground to 60-100 mesh). | ----do---- | 10 | 96 | 97 | 90 |

In Table II are given the results of standard batch desorption tests in which the columbic oxide (carrying adsorbed substances) was washed free of hold-up and then shaken for thirty minutes with 10 cc. of the elutriant indicated in the table. The percentage of fission products desorbed is given in terms of beta and gamma ray activity. The samples in Tables I and II are related by number; Table II gives the elutriant used and the amount of adsorbed activity eluted for the same sample. In Table II, the elutriant solutions of $HNO_3$, $H_2SO_4$, and $Na_2SO_4$ are given in terms of molar concentration.

*Table II*

| Sample | Elutriant | | | Percent of Adsorbed Activity Eluted | | |
|---|---|---|---|---|---|---|
| | $HNO_3$ | $H_2SO_4$ | $Na_2SO_4$ | Pu | Beta | Gamma |
| 1 | 6 | | | 27 | 135 | 90 |
| 2 | | 0.5 | 1 | 18 | 82 | 38 |
| 3 | 1 | | | 4 | 78 | 0 |
| 3 | 3 | | | 2.5 | 73 | 6.5 |
| 3 | 6 | | | 20 | 97 | 5.5 |
| 10 | 3 | | | 83 | 96 | 50 |

While the invention has been described with reference to columbic oxide ($Cb_2O_5$) which has been found to be particularly advantageous, other oxides of columbium such as $CbO_2$ may be used.

The above-detailed description is given for purposes of illustration and the invention is to be limited only by the scope of the following claims.

What is claimed is:

1. A process of separating uranium ions and plutonium ions from solutions containing uranium ions and plutonium ions which comprises passing a solution containing uranium ions and plutonium ions through a porous bed containing columbic oxide whereby at least a portion of said plutonium ions is adsorbed on said columbic oxide, and then desorbing at least a portion of said adsorbed plutonium ions from the columbic oxide.

2. A process of separating uranium ions from plutonium ions which comprises passing a solution containing uranium ions and plutonium ions through a porous bed containing columbic oxide wehreby at least a portion of said uranium ions and plutonium ions is adsorbed, and then desorbing said adsorbed uranium ions while at least a portion of said adsorbed plutonium ions remains adsorbed.

3. A process of separating uranium ions from plutonium ions in a solution containing uranium ions and plutonium ions which comprises passing a solution containing uranium ions and plutonium ions through a porous bed containing columbic oxide whereby at least a portion of said uranium ions and plutonium ions is adsorbed, and then desorbing said adsorbed uranium ions with a dilute acid solution while at least a portion of said adsorbed plutonium ions remains adsorbed.

4. A process of separating uranium ions from plutonium ions which comprises contacting a solution containing uranium ions and plutonium ions with an adsorbent of the group consisting of anhydrous columbic oxide and hydrated columbic oxide substantially free from uncombined water in liquid state whereby at least a portion of said uranium ions and plutonium ions is adsorbed, desorbing said adsorbed uranium ions with a dilute acid solution while at least a portion of the adsorbed plutonium ions remains adsorbed, and then desorbing at least a portion of said adsorbed plutonium ions.

5. A process of separating uranium ions and plutonium ions from a solution containing uranium ions and plutonium ions which comprises passing a solution containing uranium ions and plutonium ions through a column containing columbic oxide whereby at least a portion of said uranium ions and plutonium ions is adsorbed, passing a solution comprising dilute sulphuric acid through said column to desorb at least a portion of said adsorbed uranium ions, and then passing a solution comprising dilute nitric acid through said column to desorb at least a portion of said adsorbed plutonium ions.

6. A method of removing plutonium ions from a solution containing plutonium ions and uranium ions which comprises flowing the solution through a porous mass of adsorbent columbic oxide until the ratio of plutonium ions to uranium ions in the adsorbent exceeds the ratio of plutonium ions to uranium ions initially in the solution and separating the adsorbent from the solution.

7. A method of removing plutonium ions from a solution containing plutonium ions in a valent state not above 4, and uranyl uranium ions which comprises flowing the solution through a porous mass of adsorbent columbic oxide until the ratio of plutonium ions to uranium ions in the adsorbent exceeds the ratio of plutonium ions to uranium ions initially in the solution and separating the adsorbent from the solution.

8. A method of removing ions of an adsorbed element of the group consisting of plutonium, in a valent state not above 4, fission products, and uranium from adsorbent columbic oxide which comprises extracting adsorbent columbic oxide having ions of at least one of said elements adsorbed thereon with an acid and removing the resulting solution containing ions of said element from undissolved columbic oxide.

9. A method of separating plutonium ions from uranium ions which comprises contacting an aqueous solution containing uranyl uranium ions and tetravalent plutonium ios with an adsorbent of the group consisting of anhydrous columbic oxide and hydrated columbic oxide which is substantially free from uncombined water in liquid state until the ratio of plutonium ions to uranium ions in the adsorbent exceeds the ratio of plutonium ions to uranium ions initially in the solution and separating the uranyl solution from the adsorbent containing the adsorbed plutonium ions.

10. A method of removing plutonium ions from a solution containing ions of at least one element of the class consisting of uranium, plutonium and fission products which comprises precipitating columbic oxide in an aqueous medium, removing the precipitate and drying the precipitate at a temperature not less than about 100° C., contacting the dried product with the aqueous solution containing plutonium ions in a valent state not above 4 and separating the solution from the columbic oxide containing adsorbed plutonium ions.

11. A process for separating uranium ions and plutonium ions which comprises passing a solution containing uranium ions and plutonium ions through a porous bed of columbic oxide, said columbic oxide having water molecules adsorbed thereon, whereby at least a portion of said plutonium ions is adsorbed on said columbic oxide, and then desorbing at least a portion of said adsorbed plutonium ions from the columbic oxide.

References Cited in the file of this patent

UNITED STATES PATENTS

| | | |
|---|---|---|
| 1,682,239 | Patrick | Aug. 28, 1928 |
| 1,798,766 | Stoewener | Mar. 31, 1931 |

OTHER REFERENCES

Bancroft: "Applied Colloid Chemistry," pp. 131–133, 2nd ed., McGraw-Hill Book Co., N.Y. (1926).

Mellor: "Inorganic and Theoretical Chemistry," vol. 9, pp. 860–861, Longmans, London (1929).

Perry: "Chemical Engineers' Handbook," 2nd ed., pp. 1278, 1286, McGraw-Hill Book Co., N.Y. (1941).